Patented May 10, 1927.

1,628,046

UNITED STATES PATENT OFFICE.

JOHN HERMAN, OF LOS ANGELES, ARTHUR W. ALLEN, OF BERKELEY, AND HARRY R. NEWITT, OF LOS ANGELES, CALIFORNIA.

ORE FLOTATION PROCESS.

No Drawing.  Application filed November 25, 1925. Serial No. 71,430.

Our invention relates to a process of recovering valuable minerals from ores, and especially to an improved flotation process for the treatment of metalliferous ores containing the metal in the form of a combination with oxygen, including oxides, carbonates, sulphates and silicates.

In the flotation process, as ordinarily applied, the pulp of finely ground ore and water, and suitable flotation agents such as oils and soaps and the like, is subjected to agitation by the passage of small bubbles of air through the mixture. This air adheres to the particles of valuable mineral and causes them to rise to the surface and to aggregate there as foam. Such flotation process, however, although especially suitable and efficient for use in the recovery of the sulphide or sulphidized constituents of an ore, is not suitable for the recovery of the oxide or oxidized constituents.

We have discovered that by treating an ore pulp in a flotation machine with a gas of reducing properties the particles existing in the form of a combination of a metal with oxygen may be recovered as a foam, the efficiency of the operation varying with the nature of the ore, but comparing favorably in all respects with the recovery of valuable mineral particles in sulphide ores that are subjected to one of the ordinary flotation processes.

The reducing gas may be used at ordinary temperatures or it may be heated before use. We are not prepared to explain in precise terms the reason for the attraction or affinity established between the reducing gas and the oxidized ore particles. Such action may be due to the chemical propertise of the gas, and/or to its physical properties, such as surface tension, adsorption and the like. The fact remains that small bubbles of a gas other than air will adhere to particles of mineral existing as a combination of a metal with oxygen, in an ore pulp being treated under the conditions outlined, and cause them to rise to the surface and appear as a foam, available for recovery.

With the above object in view, our invention consists in the steps hereinafter described and claimed:

An ore in which the valuable mineral occurs in the oxidized form (among which may be mentioned tin oxide, lead carbonate, silver carbonate, iron carbonate, zinc carbonate, silver oxide, copper silicate, lead oxide and lead sulphate) is finely ground, as is common in flotation practice, and mixed with water and a reducing gas. We prefer to use ordinary illuminating gas, because of low cost and availability, but any other suitable gas may be found preferable. This gas, or mixture of gases, is applied to the pulp of ore and water, in the same manner as is now the practice using air; and it will be found that the oxidized mineral particles rise to the surface as foam, where they may be collected. A suitable flotation agent or mixture of flotation agents, such as soaps, oils, distillates and the like, may be used if desired, and may be found advantageous with some kinds of ore, as in present practice where air is used. The small bubbles of the gas, because of its affinity, even at ordinary temperatures, for the oxidized portions of the ore, will adhere to them, causing them to rise and permitting their recovery in the resultant foam at the top of the cell.

It will be understood that, to insure economical operation, the flotation machine will be entirely inclosed, so that the reducing gas or mixture of gases adopted for the treatment of the pulp can be withdrawn and reused in a continuous scheme of operation.

Our process is applicable for use with an ore pulp showing an acid, alkaline or neutral reaction, the particular advantage of either condition depending on the nature of the ore being treated, as with flotation insured by the use of air.

Whereas our process is suitable for the treatment of all metalliferous ores containing the metal in the form of a combination with oxygen, it is especially intended and adapted for the treatment of tin oxide ores.

The reducing gas may be used alone; or it may be mixed with other gases, especially where selective action is desired. For instance, when a lead sulphide-lead carbonate ore is being treated, it is advisable to use a mixture of air and reducing gas. The air will float the lead sulphide and the reducing gas will float the lead carbonate; and the same principle may be applied to the mixture of other ores, or to a mixed ore, with which the air will have a flotative effect on the sulphide particles. Sulphide and oxidized ores that occur together may be treated first with air, which will float the sulphide particles, and subsequently with the reducing gas, which will float the oxidized particles, or vice versa.

Various changes may be made in the application and steps of the process by those skilled in the art without departing from the spirit of the invention, as claimed.

We claim:

1. A process of flotation in the treatment of oxidized metalliferous ores comprising subjecting finely ground oxidized ore pulp to a gaseous reducing agent at a temperature where said agent is chemically inert to the ore pulp under treatment, said agent adhering to the oxidized metalliferous ore particles in small bubbles and causing them to rise to the top of the ore pulp.

2. A process of flotation in the treatment of oxidized metalliferous ores comprising subjecting finely ground oxidized ore pulp to illuminating gas at a temperature where said gas is chemically inert to the ore pulp under treatment, said gas adhering to the oxidized metalliferous ore particles in small bubbles and causing them to rise to the top of the ore pulp.

3. A process of flotation in the treatment of oxidized metalliferous ores comprising subjecting finely ground oxidized ore pulp to a gaseous reducing agent at a temperature where said agent is chemically inert to the ore pulp under treatment, said agent adhering to the oxidized metalliferous ore particles in small bubbles and causing them to rise to the top of the ore pulp, and re-using the gaseous reducing agent after its passage through the ore pulp in a continuous cycle of operation.

In testimony whereof we have signed our names to this specification.

JOHN HERMAN.
ARTHUR W. ALLEN.
HARRY R. NEWITT.